(12) United States Patent
Park et al.

(10) Patent No.: US 9,588,348 B2
(45) Date of Patent: Mar. 7, 2017

(54) 3D DISPLAY DEVICE

(71) Applicant: Samsung Display Co., Ltd., Yongin, Gyeonggi-Do (KR)

(72) Inventors: Byoung-Hee Park, Yongin (KR); Ok-Keun Song, Yongin (KR); Yong-Han Lee, Yongin (KR); Young-Shin Lee, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 86 days.

(21) Appl. No.: 13/929,422

(22) Filed: Jun. 27, 2013

(65) Prior Publication Data

US 2014/0133023 A1 May 15, 2014

(30) Foreign Application Priority Data

Nov. 12, 2012 (KR) ........................ 10-2012-0127721

(51) Int. Cl.
*G02B 27/22* (2006.01)
*H04N 13/04* (2006.01)

(52) U.S. Cl.
CPC ..... *G02B 27/2214* (2013.01); *H04N 13/0404* (2013.01); *H04N 13/0422* (2013.01)

(58) Field of Classification Search
CPC ........... H04N 13/0404; H04N 13/0422; G02B 27/2214

USPC ................................ 359/462–477; 348/42–60
See application file for complete search history.

(56) References Cited

U.S. PATENT DOCUMENTS

| 6,392,690 | B1 * | 5/2002 | Fujii et al. ...................... 348/59 |
| 7,070,278 | B2 * | 7/2006 | Pezzaniti ......................... 353/7 |
| 2005/0012814 | A1 * | 1/2005 | Shen ............................... 348/51 |
| 2009/0231698 | A1 * | 9/2009 | Hashimoto et al. .......... 359/476 |
| 2010/0097545 | A1 * | 4/2010 | Robinson et al. .............. 349/95 |
| 2012/0092339 | A1 | 4/2012 | Pijlman et al. |
| 2012/0293735 | A1 * | 11/2012 | Jung et al. ...................... 349/15 |

FOREIGN PATENT DOCUMENTS

| JP | 2003-029205 A | 1/2003 |
| KR | 10-2011-0024970 A | 3/2011 |
| KR | 10-2011-0083670 A | 7/2011 |
| KR | 10-2011-0112762 A | 10/2011 |
| KR | 10-2011-0115324 A | 10/2011 |
| KR | 10-2012-0052236 A | 5/2012 |
| KR | 10-2012-0054525 A | 5/2012 |

* cited by examiner

*Primary Examiner* — Thomas K Pham
*Assistant Examiner* — Mitchell Oestreich
(74) *Attorney, Agent, or Firm* — Robert E. Bushnell, Esq.

(57) ABSTRACT

The 3D display device includes a display panel including a first pixel area displaying a left-eye image, and a second pixel area neighboring the first pixel area and displaying a right-eye image, and a lenticular lens unit positioned on the display panel to cover the first pixel area and the second pixel area and having at least one color.

3 Claims, 7 Drawing Sheets

3D DISPLAY DEVICE

CLAIM OF PRIORITY

This application claims priority to and the benefit of Korean Patent Application No. 10-2012-0127721 filed in the Korean Intellectual Property Office on Nov. 12, 2012, the entire contents of which are incorporated herein by reference.

BACKGROUND OF THE INVENTION

Field of the Invention

The described technology relates generally to a display device. More particularly, the described technology relates generally to a 3D display device realizing a 3D image.

Description of the Related Art

In general, people recognize a stereoscopic effect physiologically and experientially. In three-dimensional image display technology, a stereoscopic effect of an object is produced by using binocular parallax, which is a primary factor in recognizing a stereoscopic effect at a short distance. Stereoscopic images are viewed by a stereoscopic method involving wearing of spectacles or by an autostereoscopic method not involving wearing of spectacles.

Among others, as an autostereoscopic scheme, there are a parallax barrier scheme and a lenticular lens scheme. The lenticular lens scheme disposes images corresponding to a left eye or a right eye on a focusing surface of a lens and separates images into the left and right eyes of the user according to the directional characteristics of the lenticular lens, and the user recognizes them when the user observes images through the lenticular lens, such that the user recognizes the 3D images.

In this case, the 3D display device of the lenticular lens method further includes a color filter to realize a color of the 3D image, and the conventional 3D display device includes the color filter and the lenticular lens, thereby the entire thickness of the 3D display device is thick and it is difficult to realize a slim 3D display device.

Also, in the 3D display device of the conventional lenticular lens method, by sequentially disposing the color filter and the lenticular lens on the display panel displaying a 2D image, when the display panel, the color filter, and the lenticular lens are respectively aligned, an error is generated such that the 3D image displayed from the 3D display device may deteriorate.

The above information disclosed in this Background section is only for enhancement of understanding of the background of the described technology and therefore it may contain information that does not form the prior art that is already known in this country to a person of ordinary skill in the art.

SUMMARY OF THE INVENTION

An exemplary embodiment provides a 3D display device minimizing 3D image deterioration due to an alignment error and simultaneously having a slim thickness.

A 3D display device includes: a display panel including a first pixel area displaying a left-eye image and a second pixel area neighboring the first pixel area and displaying a right-eye image; and a lenticular lens unit positioned on the display panel to cover the first pixel area and the second pixel area and having at least one color.

The first pixel area may include: a first sub-pixel area; a second sub-pixel area neighboring the first sub-pixel area in a first direction; and a third sub-pixel area neighboring the second sub-pixel area in the first direction, and the second pixel area includes: a fourth sub-pixel area neighboring the third sub-pixel area in the first direction; a fifth sub-pixel area neighboring the fourth sub-pixel area in the first direction; and a sixth sub-pixel area neighboring the fifth sub-pixel area in the first direction.

The lenticular lens unit may include a lenticular lens covering the first pixel area and the second pixel area.

The lenticular lens may include: a first lens unit covering the first sub-pixel area and the second sub-pixel area and having a first color; a second lens unit covering the third sub-pixel area and the fourth sub-pixel area while neighboring the first lens unit and having a second color; and a third lens unit covering the fifth sub-pixel area and the sixth sub-pixel area while neighboring the second lens unit and having a third color, and the first lens unit, the second lens unit, and the third lens unit form a lens surface of the lenticular lens.

The lenticular lens unit may include: a first lenticular lens covering the first sub-pixel area and the second sub-pixel area and having a first color; a second lenticular lens covering the third sub-pixel area and the fourth sub-pixel area while neighboring the first lenticular lens and having a second color; and a third lenticular lens covering the fifth sub-pixel area and the sixth sub-pixel area while neighboring the second lenticular lens and having a third color.

The first lenticular lens, the second lenticular lens, and the third lenticular lens may extend in a second direction crossing the first direction.

The first lenticular lens may include a plurality of sub-first lenticular lenses, the sub-first lenticular lenses may be disposed to be separated from each other in the second direction crossing the first direction, the second lenticular lens may include a plurality of sub-second lenticular lenses, the sub-second lenticular lenses may be disposed to be separated from each other in the second direction, the third lenticular lens may include a plurality of sub-third lenticular lenses, and the sub-third lenticular lenses may be disposed to be separated from each other in the second direction.

The lenticular lens unit may include a fourth lenticular lens covering the first pixel area, and a fifth lenticular lens neighboring the fourth lenticular lens and covering the second pixel area.

The fourth lenticular lens may include: a fourth lens unit covering the first sub-pixel area and having a first color; a fifth lens unit covering the second sub-pixel area while neighboring the fourth lens unit and having a second color; and a sixth lens unit covering the third sub-pixel area while neighboring the fifth lens unit and having a third color, wherein the fourth lens unit, the fifth lens unit, and the sixth lens unit may form a lens surface of the fourth lenticular lens. The fifth lenticular lens may include: a seventh lens unit covering the fourth sub-pixel area while neighboring the sixth lens unit and having the first color; an eighth lens unit covering the fifth sub-pixel area while neighboring the seventh lens unit and having the second color; and a ninth lens unit covering the sixth sub-pixel area while neighboring the eighth lens unit and having the third color, wherein the seventh lens unit, the eighth lens unit, and the ninth lens unit may form a lens surface of the fifth lenticular lens.

The lenticular lens unit may include: a sixth lenticular lens covering the first sub-pixel area and having a first color; a seventh lenticular lens covering the second sub-pixel area while neighboring the sixth lenticular lens and having a second color; an eighth lenticular lens covering the third sub-pixel area while neighboring the seventh lenticular lens and having a third color; a ninth lenticular lens covering the fourth sub-pixel area while neighboring the eighth lenticular lens and having the first color; a tenth lenticular lens covering the fifth sub-pixel area while neighboring the ninth lenticular lens and having the second color; and an eleventh lenticular lens covering the sixth sub-pixel area while neighboring the tenth lenticular lens and having the third color.

The sixth lenticular lens, the seventh lenticular lens, the eighth lenticular lens, the ninth lenticular lens, the tenth lenticular lens, and the eleventh lenticular lens may extend in the second direction crossing the first direction.

The sixth lenticular lens may includes a plurality of sub-sixth lenticular lenses, the sub-sixth lenticular lenses may be disposed to be separated from each other in the second direction crossing the first direction, the seventh lenticular lens may includes a plurality of sub-seventh lenticular lenses, the sub-seventh lenticular lenses may be disposed to be separated from each other in the second direction, the eighth lenticular lens may includes a plurality of sub-eighth lenticular lenses, and the sub-eighth lenticular lenses may be disposed to be separated from each other in the second direction.

The ninth lenticular lens may includes a plurality of sub-ninth lenticular lenses, the sub-ninth lenticular lenses may be disposed to be separated from each other in the second direction, the tenth lenticular lens may includes a plurality of sub-tenth lenticular lenses, the sub-tenth lenticular lenses may be disposed to be separated from each other in the second direction, the eleventh lenticular lens may includes a plurality of sub-eleventh lenticular lenses, and the sub-eleventh lenticular lenses may be disposed to be separated from each other in the second direction.

The first color, the second color, and the third color may be a color selected from red, green, and blue.

A window positioned between the display panel and the lenticular lens unit may be further included, and the lenticular lens unit may be formed at a surface of the window.

The lenticular lens unit may be formed through a photolithography process.

According to an exemplary embodiment, the 3D display device minimizing the 3D image deterioration due to the alignment error and simultaneously having the slim thickness is provided.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Furthermore, with exemplary embodiments, detailed description is given for the constituent elements in the first exemplary embodiment with reference to the relevant drawings by using the same reference numerals for the same constituent elements, while only different constituent elements from those related to the first exemplary embodiment are described in other exemplary embodiments.

The parts that are irrelevant to the description are omitted in order to clearly describe the present invention, and like reference numerals designate like elements throughout the specification.

Furthermore, as the size and thickness of the respective structural components shown in the drawings are arbitrarily illustrated for explanatory convenience, the present invention is not necessarily limited to as illustrated.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements.

Now, a 3D (three dimensional) display device according to the first exemplary embodiment will be described with reference to FIG. 1 and FIG. 2.

Figure 1:
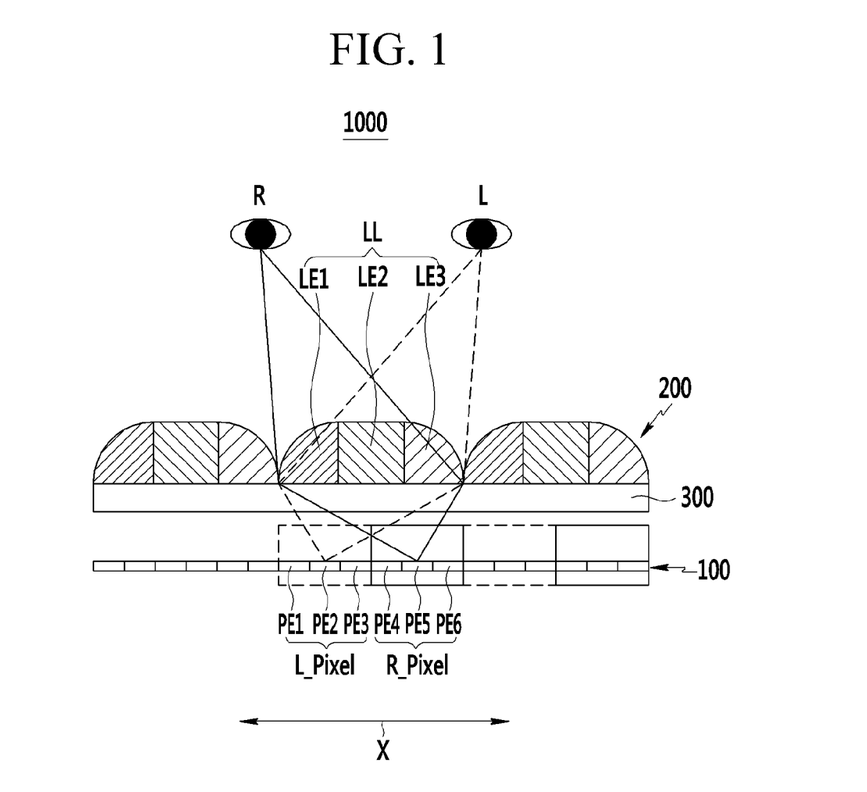
FIG. 1 is a cross-sectional view of a 3D display device according to the first exemplary embodiment.

FIG. 1 is a cross-sectional view of a 3D display device according to the first exemplary embodiment.

As shown in FIG. 1, a 3D display device 1000 according to the first exemplary embodiment selectively displays a 3D image and includes a display panel 100, a lenticular lens unit 200, and a window 300.

The display panel 100 displays a 2D image as a plane image and may be an organic light emitting diode (OLED) display or a liquid crystal display (LCD).

More specifically, the display unit 100 displays a left-eye image and a right-eye image in order to allow a user to recognize the 3D image.

When the display panel 100 is the liquid crystal display (LCD), the display panel 100 includes a display panel including two substrates and liquid crystals positioned between the two substrates and a backlight unit irradiating the display panel with light. Herein, both substrates may include a substrate body made of glass, plastic or metal, and a metal pattern formed on the substrate body and used as an electrode. A longitudinal or transverse electric field is formed in a space between the two substrates, such that a liquid crystal layer serves as a shutter in accordance with the longitudinal or transverse electric field. Therefore, the display panel 100 displays the 2D image.

Further, when the display panel 100 is the organic light emitting diode display, the display panel 100 includes two substrates and an organic light emitting diode positioned between the two substrates. Herein, the organic light emitting diode is a self-light emitting diode, and an organic emission layer included in the organic light emitting diode emits white light to display the 2D image.

The display panel 100 includes a first pixel area L_Pixel and a second pixel area R_Pixel as a pixel that is a minimum unit displaying the image.

The first pixel area L_Pixel displays a left-eye image realized through the left eye L of the user, and the second pixel area R_Pixel displays a right-eye image realized through the right eye R of the user. The first pixel area L_Pixel includes a first sub-pixel area PE1, a second sub-pixel area PE2, and a third sub-pixel area PE3 that are sequentially disposed in the first direction X. The first sub-pixel area PE1 and the second sub-pixel area PE2 neighbor each other, and the second sub-pixel area PE2 neighbors the first sub-pixel area PE1 in the first direction X. The third sub-pixel area PE3 neighbors the second sub-pixel area PE2 in the first direction X. That is, the second sub-pixel area PE2 is disposed between the first sub-pixel area PE1 and the third sub-pixel area PE3. The first sub-pixel area PE1, the second sub-pixel area PE2, and the third sub-pixel area PE3 form the first pixel area L_Pixel displaying the left-eye image, and the first sub-pixel area PE1, the second pixel area R_Pixel, and the third sub-pixel area PE3 respectively display the image respectively representing red, green, and blue.

The second pixel area R_Pixel includes a fourth sub-pixel area PE4, a fifth sub-pixel area PE5, and a sixth sub-pixel area PE6 sequentially disposed in the first direction X. The fourth sub-pixel area PE4 neighbors the third sub-pixel area PE3 in the first direction X. The fifth sub-pixel area PE5 neighbors the fourth sub-pixel area PE4 in the first direction X. The sixth sub-pixel area PE6 neighbors the fifth sub-pixel area PE5 in the first direction X. That is, the fifth sub-pixel area PE5 is disposed between the fourth sub-pixel area PE4 and the sixth sub-pixel area PE6. The fourth sub-pixel area PE4, the fifth sub-pixel area PE5, and the sixth sub-pixel area PE6 form the second pixel area R_Pixel displaying the right-eye image, and the fourth sub-pixel area PE4, the fifth sub-pixel area PE5, and the sixth sub-pixel area PE6 respectively display the image respectively representing red, green, and blue.

The lenticular lens unit 200 positioned on the display panel 100 covers the first pixel area L_Pixel and the second pixel area R_Pixel and has at least one color. The lenticular lens unit 200 is formed on a surface of the window 300 and may be formed by photolithography. In detail, to form the lenticular lens unit 200, a photoresist layer is formed on the surface of the window 300 and is exposed by using a mask having several slits having different transmittances or a semi-transparent mask, and the photoresist is developed, thereby forming a lenticular lens shape. Meanwhile, the lenticular lens unit 200 may be formed with a sheet shape, and the lenticular lens unit 200 of the sheet shape is attached to the window 300 to form the lenticular lens unit 200 on the surface of the window 300.

For example, the lenticular lens unit 200 has a refractive index similar to a glass and includes a pattern of a uniform lenticular lens shape having a desired curvature by using a high molecular weight-based material.

The lenticular lens unit 200 includes a lenticular lens LL covering the first pixel area L_Pixel and the second pixel area R_Pixel.

A plurality of lenticular lenses LL are disposed in the first direction, and include the first lens unit LE1, the second lens unit LE2, and the third lens unit LE3.

The first lens unit LE1 covers the first sub-pixel area PE1 and the second sub-pixel area PE2 and has the first color. Here, the first color is a selected color from red, green, and blue, and for example, the first color may be red.

The second lens unit LE2 neighboring the first lens unit LE1 covers the third sub-pixel area PE3 and the fourth sub-pixel area PE4 and has the second color. Here, the second color is a selected color from red, green, and blue, and for example, the second color may be green.

The third lens unit LE3 neighboring the second lens unit LE2 covers the fifth sub-pixel area PE5 and the sixth sub-pixel area PE6 and has the third color. Here, the third color is a selected color from red, green, and blue, and for example, the third color may be blue.

The second lens unit LE2 is disposed between the first lens unit LE1 and the third lens unit LE3, and the first lens unit LE1, the second lens unit LE2, and the third lens unit LE3 form a lens surface of the lenticular lens LL formed with a curved surface. As shown in FIG. 1, the first through third lens units LE1, LE2 and LE3 form portions of a single lenticular lens LL.

The above lens unit 200 serves as a viewing zone separation unit which separates a left-eye image L and a right-eye image R which are displayed through the first pixel area L_Pixel and the second pixel area R_Pixel to be recognized in the left eye and the right eye of the user, respectively.

In detail, if the first pixel area L_Pixel and the second pixel area R_Pixel of the display panel 100 positioned at the position respectively corresponding to a plurality of lenticular lenses LL included in the lenticular lens unit 200 respectively display the left-eye image (a dotted line irradiated to the left eye L of the user in FIG. 1) and the right-eye image (a solid line irradiated to the right eye R of the user in FIG. 1), the left-eye image is refracted through the lenticular lens LL to be recognized by the left eye of the user and the right-eye image is refracted through the lenticular lens LL to be recognized by the right eye of the user, and thereby the user recognizes the image from the 3D display device 1000 by the binocular disparity as the 3D image. At this time, the image respectively displayed by the first sub-pixel area PE1 and the fourth sub-pixel area PE4 has the first color through the first lens unit LE1, the image respectively displayed by the second sub-pixel area PE2 and the fifth sub-pixel area PE5 has the second color through the second lens unit LE2, and the image respectively displayed by the third sub-pixel area PE3 and the sixth sub-pixel area PE6 has the third color through the third lens unit LE3. Accordingly, the user recognizes the 3D image having various colors.

Next, referring to FIG. 2, a distance determination between constitutions forming the 3D display device 1000 according to the first exemplary embodiment will be described.

Figure 2:
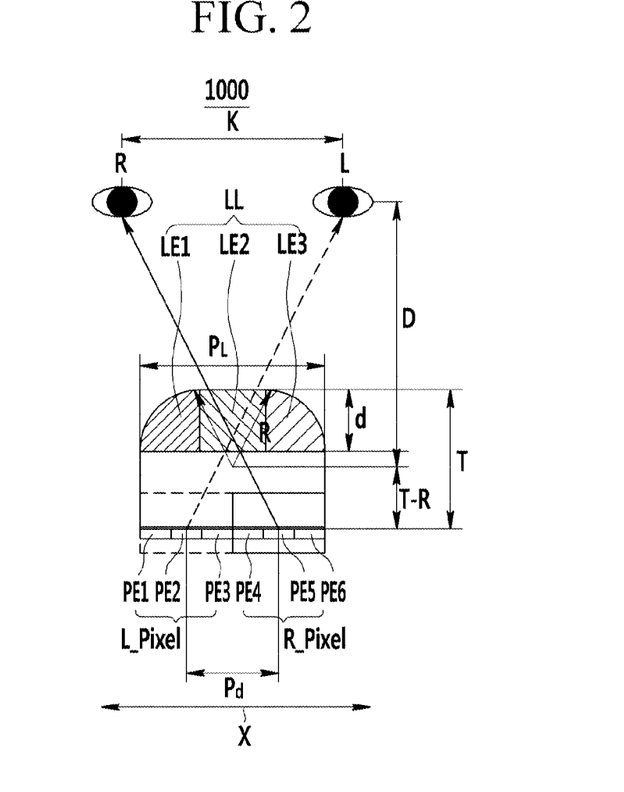
FIG. 2 is a cross-sectional view to explain a distance between constitutions shown in FIG. 1.

FIG. 2 is a cross-sectional view to explain a distance between constitutions shown in FIG. 1.

As shown in FIG. 2, the distance between the constitutions may be determined by Equation 1, Equation 2, and Equation 3.

Thickness $(T)=R*[n/(n-1)]$  [Equation 1]

Curvature radius $(R)=\{(P_L/2)^2+d^2\}/2d$  [Equation 2]

Thickness $(T)=(D/K*P_D)+R$  [Equation 3]

In Equation 1, Equation 2, and Equation 3, R represents a curvature radius of the lenticular lens LL, n represents a refractive index of the lenticular lens LL, d represents a thickness of the lenticular lens LL, $P_L$ represents a pitch of the lenticular lens LL, K represents a distance between the left eye L and the right eye R of the user, D represents an effective viewing distance, and $P_D$ represents a pitch between the second sub-pixel area PE2 and the fifth sub-pixel area PE5 in the display panel 100.

The thickness T in Equation 1 is important when selecting a material of the lenticular lens unit 200 related to the refractive index, and the entire 3D display device 1000 may be constituted by using Equation 2 and Equation 3. The pixel pitch $P_D$ of the display panel 100, the effective viewing distance D, the distance between the eyes K (for example, 65 mm) as constants may be determined according to the size (inches) of the display panel 100, and the curvature radius (R), the thickness (T), etc., may be easily obtained through Equation 2 and Equation 3. The lenticular lens unit 200 may require a thickness of more than, for example, 10 mm, and may be controlled along with the window 300 in the liquid crystal display (LCD) or the organic light emitting diode (OLED) display As described above, in the 3D display device 1000 according to the first exemplary embodiment, while the lenticular lens unit 200 as the viewing zone separation unit covers the first pixel area L_Pixel and the second pixel area R_Pixel, one lenticular lens LL has the first color, the second color, and the third color, thereby displaying the full color 3D image without an additional color filter.

That is, the color filter and the lenticular lens are not sequentially aligned on the display panel 100, but the lenticular lens unit 200 is simply only aligned on the display panel 100 such that the deterioration of the 3D image generated according to an alignment error may be minimized.

Also, the 3D display device 1000 according to the first exemplary embodiment does not require the additional color filter such that the entire thickness may be realized to be slim.

Next, referring to FIG. 3, a 3D display device according to the second exemplary embodiment will be described.

Figure 3:
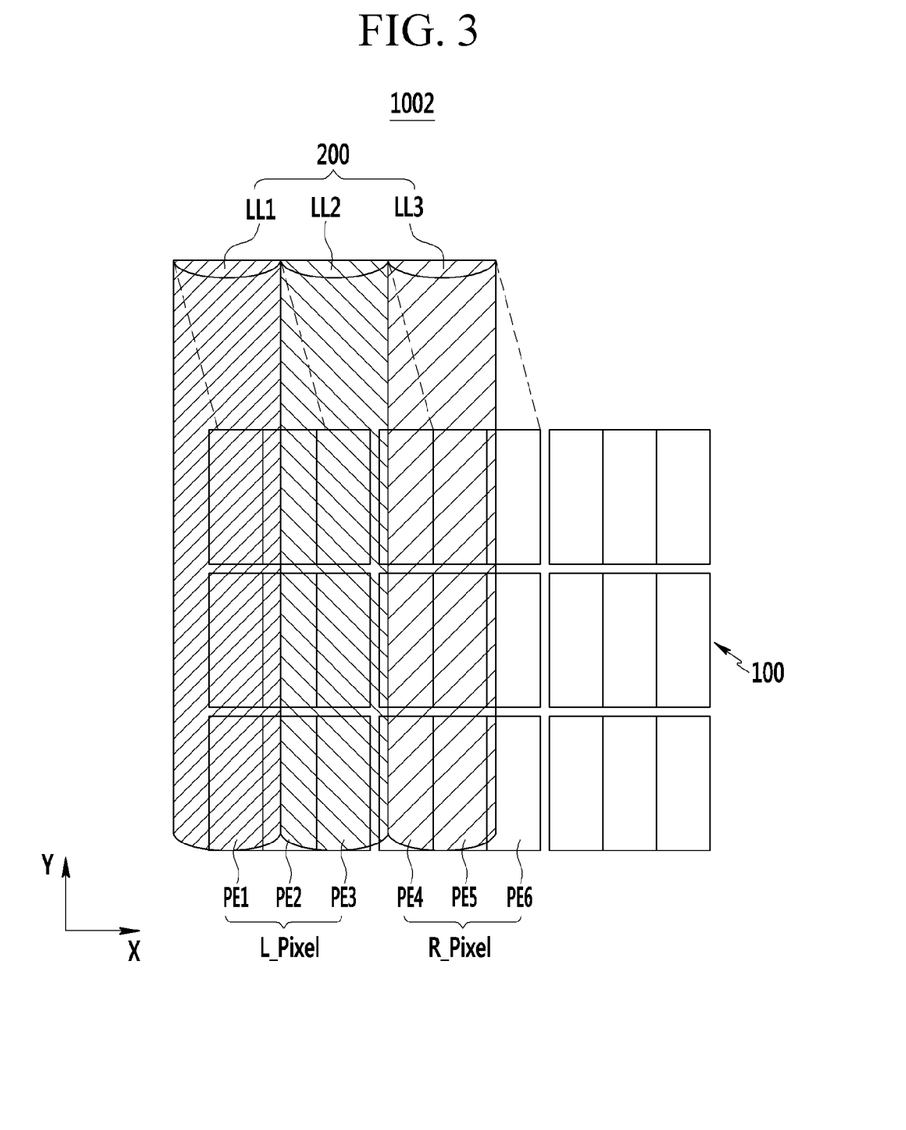
FIG. 3 is a view of a 3D display device according to the second exemplary embodiment.

FIG. 3 is a view of a 3D display device according to the second exemplary embodiment.

Parts that are different from the first exemplary embodiment will be described, and parts that are not described follow the first exemplary embodiment. For better comprehension and ease of description, the constituent elements of the second exemplary embodiment that are the same as in the first exemplary embodiment will have the same reference numerals.

As shown in FIG. 3, the lenticular lens unit 200 of the 3D display device 1002 according to the second exemplary embodiment includes a first lenticular lens LL1, a second lenticular lens LL2, and a third lenticular lens LL3.

The first lenticular lens LL1 covers the first sub-pixel area PE1 and the second sub-pixel area PE2 and has the first color (covering areas are marked with dotted lines). Here, the first color may be the color selected from red, green, and blue, and for example, the first color may be red.

The second lenticular lens LL2 covers the third sub-pixel area PE3 and the fourth sub-pixel area PE4 and has the second color. Here, the second color may be the color selected from red, green, and blue, and for example, the second color may be green.

The third lenticular lens LL3 covers the fifth sub-pixel area PE5 and the sixth sub-pixel area PE6 and has the third color. Here, the third color may be the color selected from red, green, and blue, and for example, the third color may be blue.

The first lenticular lens LL1, the second lenticular lens LL2, and the third lenticular lens LL3 extend the second direction Y crossing the first direction X.

The above lens unit 200 serves as a viewing zone separation unit which separates a left-eye image L and a right-eye image R which are displayed through the first pixel area L_Pixel and the second pixel area R_Pixel to be recognized in the left eye and the right eye of the user, respectively.

In detail, if the first pixel area L_Pixel and the second pixel area R_Pixel of the display panel 100 positioned at the position respectively corresponding to the first lenticular lens LL1, the second lenticular lens LL2, and the third lenticular lens LL3 included in the lenticular lens unit 200 respectively display the left-eye image and the right-eye image, the left-eye image is refracted through the lenticular lens LL to be recognized by the left eye of the user and the right-eye image is refracted through the lenticular lens LL to be recognized by the right eye of the used, and thereby the user recognizes the image from the 3D display device 1002 by the binocular disparity as the 3D image. At this time, the image respectively displayed by the first sub-pixel area PE1 and the fourth sub-pixel area PE4 has the first color through the first lenticular lens LL1, the image respectively displayed by the second sub-pixel area PE2 and the fifth sub-pixel area PE5 has the second color through the second lenticular lens LL2, and the image respectively displayed by the third sub-pixel area PE3 and the sixth sub-pixel area PE6 has the third color through the third lenticular lens LL3. Accordingly, the user recognizes the 3D image having various colors.

As described above, in the 3D display device 1002 according to the second exemplary embodiment, while the lenticular lens unit 200 as the viewing zone separation unit covers the first pixel area L_Pixel and the second pixel area R_Pixel, the first lenticular lens LL1, the second lenticular lens LL2, and the third lenticular lens LL3 respectively have the first color, the second color, and the third color, thereby displaying the full color 3D image without the additional color filter.

That is, the color filter and the lenticular lens are not sequentially aligned on the display panel 100, but the lenticular lens unit 200 is simply only aligned on the display panel 100 such that the deterioration of the 3D image generated according to the align error may be minimized.

Also, the 3D display device 1002 according to the second exemplary embodiment does not require the additional color filter such that the entire thickness may be realized to be slim.

Next, referring to FIG. 4, a 3D display device according to the third exemplary embodiment will be described.

Figure 4:
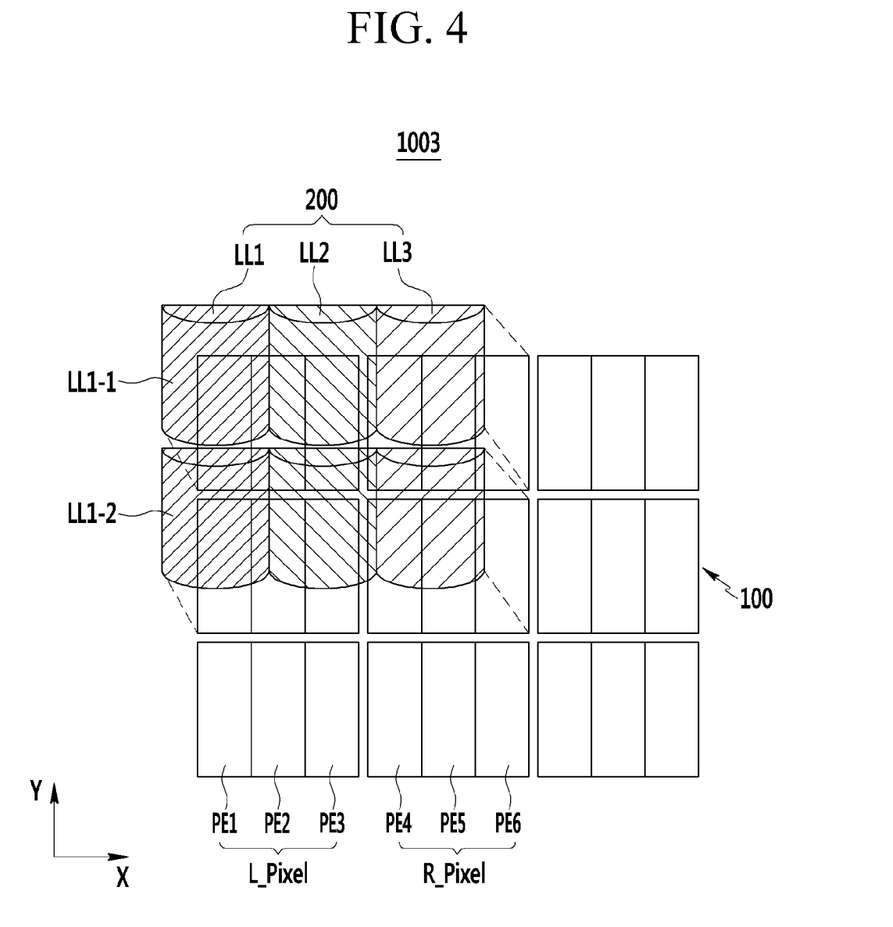
FIG. 4 is a view of a 3D display device according to the third exemplary embodiment.

FIG. 4 is a view of a 3D display device according to the third exemplary embodiment.

Parts that are different from the second exemplary embodiment will be described, and parts that are not described follow the second exemplary embodiment. For better comprehension and ease of description, the constituent elements of the third exemplary embodiment that are the same as the second exemplary embodiment will have the same reference numerals.

As shown in FIG. 4, the lenticular lens unit 200 of the 3D display device 1003 according to the third exemplary embodiment includes the first lenticular lens LL1, the second lenticular lens LL2, and the third lenticular lens LL3.

The first lenticular lens LL1, the second lenticular lens LL2, and the third lenticular lens LL3 are disposed in plural. The first lenticular lens LL1 includes a plurality of sub-first lenticular lenses LL1-1 and LL1-2, and the sub-first lenticular lenses LL1-1 and LL1-2 are respectively disposed to be separated from each other in the second direction Y crossing the first direction X. With the same principles, the second lenticular lens LL2 includes a plurality of sub-second lenticular lenses, and the sub-second lenticular lenses are respectively disposed to be separated from each other in the second direction Y crossing the first direction X. The third lenticular lens LL3 includes a plurality of sub-third lenticular lenses, and the sub-third lenticular lenses LL3 are respectively disposed to be separated from each other in the second direction Y crossing the first direction X.

The above lens unit 200 serves as a viewing zone separation unit which separates a left-eye image L and a right-eye image R which are displayed through the first pixel area L_Pixel and the second pixel area R_Pixel to be recognized by the left eye and the right eye of the user, respectively.

As described above, in the 3D display device 1003 according to the third exemplary embodiment, while the lenticular lens unit 200 as the viewing zone separation unit covers the first pixel area L_Pixel and the second pixel area R_Pixel, the first lenticular lens LL1, the second lenticular lens LL2, and the third lenticular lens LL3 respectively have the first color, the second color, and the third color, thereby displaying the full color 3D image without the additional color filter.

That is, the color filter and the lenticular lens are not sequentially aligned on the display panel 100, but the lenticular lens unit 200 is simply only aligned on the display panel 100 such that the deterioration of the 3D image generated according to the align error may be minimized.

Also, the 3D display device 1003 according to the third exemplary embodiment does not require the additional color filter such that the entire thickness may be realized to be slim.

Next, referring to FIG. 5, a 3D display device according to the fourth exemplary embodiment will be described.

Figure 5:
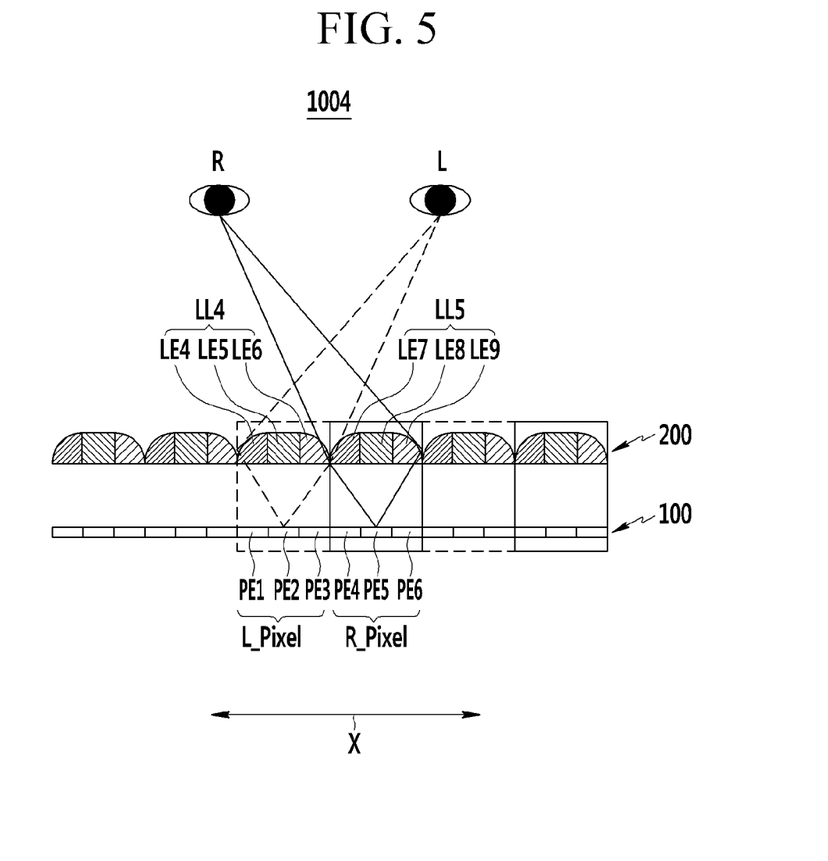
FIG. 5 is a cross-sectional view of a 3D display device according to the fourth exemplary embodiment.

FIG. 5 is a view of a 3D display device according to the fourth exemplary embodiment.

Parts that are different from the first exemplary embodiment will be described, and parts that are not described follow the first exemplary embodiment. For better comprehension and ease of description, the constituent elements of the fourth exemplary embodiment that are the same as the first exemplary embodiment will have the same reference numerals.

As shown in FIG. 5, the lenticular lens unit 200 of the 3D display device 1004 according to the fourth exemplary embodiment includes the fourth lenticular lens LL4 covering the first pixel area L_Pixel and the fifth lenticular lens LL5 covering the second pixel area R_Pixel.

The fourth lenticular lens LL4 includes the fourth lens unit LE4, the fifth lens unit LE5, and the sixth lens unit LE6.

The fourth lens unit LE4 covers the first sub-pixel area PE1 and has the first color. Here, the first color may be the color selected from red, green, and blue, and for example the first color may be red.

The fifth lens unit LE5 neighboring the fourth lens unit LE4 covers the second sub-pixel area PE2 and has the second color. Here, the second color may be the color selected from red, green, and blue, and for example the second color may be green.

The sixth lens unit LE6 neighboring the fifth lens unit LE5 covers the third sub-pixel area PE3 and has the third color. Here, the third color may be the color selected from red, green, and blue, and for example the third color may be blue.

The fifth lens unit LE5 is disposed between the fourth lens unit LE4 and the sixth lens unit LE6, and the fourth lens unit LE4, the fifth lens unit LE5, and the sixth lens unit LE6 form the lens surface of the fourth lenticular lens LL4 formed with the curved surface.

The fifth lenticular lens LL5 includes the seventh lens unit LE7, the eighth lens unit LE8, and the ninth lens unit LE9.

The seventh lens unit LE7 neighboring the sixth lens unit LE6 covers the fourth sub-pixel area PE4 and has the first color. Here, the first color may be the color selected from red, green, and blue, and for example the first color may be red.

The eighth lens unit LE8 neighboring the seventh lens unit LE7 covers the fifth sub-pixel area PE5 and has the second color. Here, the second color may be the color selected from red, green, and blue, and for example the second color may be green.

The ninth lens unit LE9 neighboring the eighth lens unit LE8 covers the sixth sub-pixel area PE6 and has the third color. Here, the third color may be the color selected from red, green, and blue, and for example the third color may be blue.

The eighth lens unit LE8 is disposed between the seventh lens unit LE7 and the ninth lens unit LE9, and the seventh lens unit LE7, the eighth lens unit LE8, and the ninth lens unit LE9 form the lens surface of the fifth lenticular lens LL5 formed with the curved surface.

The above lens unit 200 serves as a viewing zone separation unit which separates a left-eye image L and a right-eye image R which are displayed through the first pixel area L_Pixel and the second pixel area R_Pixel to be recognized by the left eye and the right eye of the user, respectively.

In detail, if the first pixel area L_Pixel and the second pixel area R_Pixel of the display panel 100 positioned at the position respectively corresponding to the fourth lenticular lens LL4 and the fifth lenticular lens LL5 included in the lenticular lens unit 200 respectively display the left-eye image (a dotted line irradiated to the left eye L of the user in FIG. 5) and the right-eye image (a solid line irradiated to the right eye R of the user in FIG. 5), the left-eye image is refracted through the fourth lenticular lens LL4 to be recognized by the left eye of the user and the right-eye image is refracted through the fifth lenticular lens LL5 to be recognized by the right eye of the used, and thereby the user recognizes the image from the 3D display device 1004 by the binocular disparity as the 3D image. At this time, the image respectively displayed by the first sub-pixel area PE1 and the fourth sub-pixel area PE4 has the first color through the fourth lens unit LE4 and the seventh lens unit LE7, the image respectively displayed by the second sub-pixel area PE2 and the fifth sub-pixel area PE5 has the second color through the fifth lens unit LE5 and the eighth lens unit LE8, and the image respectively displayed by the third sub-pixel area PE3 and the sixth sub-pixel area PE6 has the third color through the sixth lens unit LE6 and the ninth lens unit LE9. Accordingly, the user recognizes the 3D image having various colors.

As described above, in the 3D display device 1004 according to the fourth exemplary embodiment, while the lenticular lens unit 200 as the viewing zone separation unit covers the first pixel area L_Pixel and the second pixel area R_Pixel, the fourth lens unit LE4, the fifth lens unit LE5, and the sixth lens unit LE6 of the fourth lenticular lens LL4 and the seventh lens unit LE7, the eighth lens unit LE8, and the ninth lens unit LE9 of the fifth lenticular lens LL5 respectively have the first color, the second color, and the third color, thereby displaying the full color 3D image without the additional color filter.

That is, the color filter and the lenticular lens are not sequentially aligned on the display panel 100, but the lenticular lens unit 200 is simply only aligned on the display panel 100 such that the deterioration of the 3D image generated according to the align error may be minimized.

Also, the 3D display device 1004 according to the fourth exemplary embodiment does not require the additional color filter such that the entire thickness may be realized to be slim.

Next, referring to FIG. 6, a 3D display device according to the fifth exemplary embodiment will be described.

Figure 6:
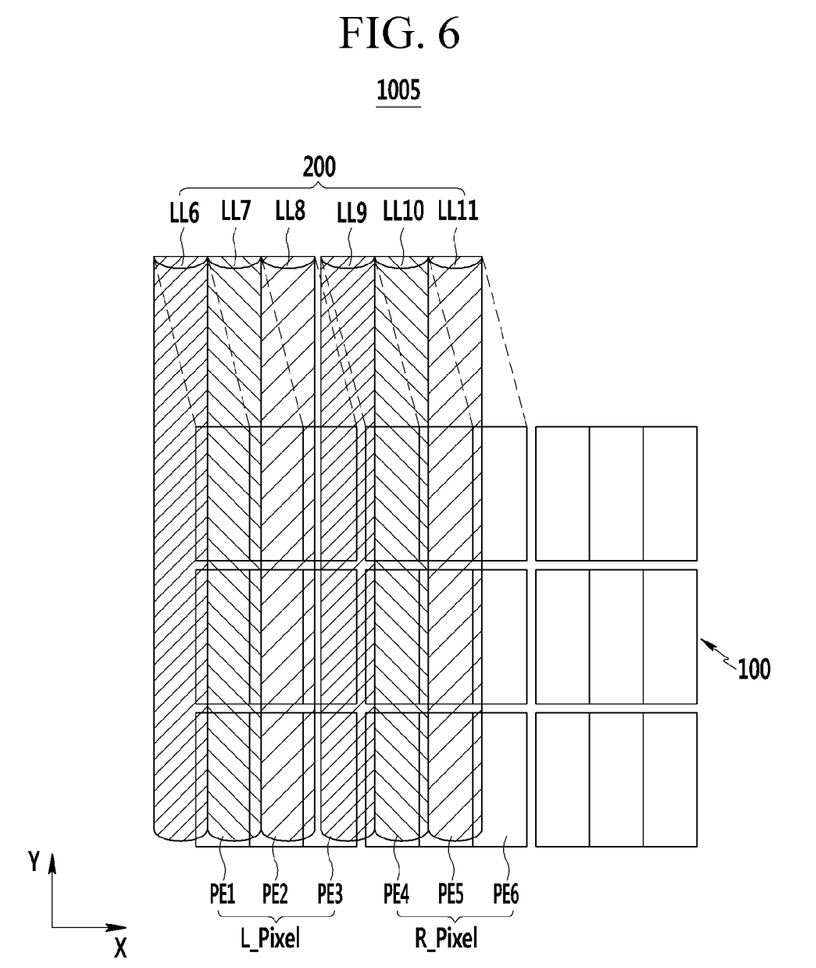
FIG. 6 is a view of a 3D display device according to the fifth exemplary embodiment.

FIG. 6 is a view of a 3D display device according to the fifth exemplary embodiment.

Parts that are different from the first exemplary embodiment will be described, and parts that are not described follow the first exemplary embodiment. For better comprehension and ease of description, the constituent elements of the fifth exemplary embodiment that are the same as the first exemplary embodiment will have the same reference numerals.

As shown in FIG. 6, the lenticular lens unit 200 of the 3D display device 1005 according to the fifth exemplary embodiment includes the sixth lenticular lens LL6, the seventh lenticular lens LL7, the eighth lenticular lens LL8, the ninth lenticular lens LL9, the tenth lenticular lens LL10, and the eleventh lenticular lens LL11 that are sequentially disposed in the first direction X.

The sixth lenticular lens LL6 covers the first sub-pixel area PE1 and has the first color. Here, the first color may be the color selected from red, green, and blue, and for example, the first color may be red.

The seventh lenticular lens LL7 covers the second sub-pixel area PE2 and has the second color. Here, the second color may be the color selected from red, green, and blue, and for example, the second color may be green.

The eighth lenticular lens LL8 covers the third sub-pixel area PE3 and has the third color. Here, the third color may be the color selected from red, green, and blue, and for example, the third color may be blue.

The ninth lenticular lens LL9 covers the fourth sub-pixel area PE4 and has the first color.

The tenth lenticular lens LL10 covers the fifth sub-pixel area PE5 and has the second color.

The eleventh lenticular lens LL11 covers the sixth sub-pixel area PE6 and has the third color.

The sixth lenticular lens LL6, the seventh lenticular lens LL7, the eighth lenticular lens LL8, the ninth lenticular lens LL9, the tenth lenticular lens LL10, and the eleventh lenticular lens LL11 extend in the second direction Y crossing the first direction X.

The above lens unit 200 serves as a viewing zone separation unit which separates a left-eye image L and a right-eye image R which are displayed through the first pixel area L_Pixel and the second pixel area R_Pixel to be recognized by the left eye and the right eye of the user, respectively.

In detail, if the first pixel area L_Pixel and the second pixel area R_Pixel of the display panel 100 positioned at the position respectively corresponding to the sixth lenticular lens LL6, the seventh lenticular lens LL7, the eighth lenticular lens LL8, the ninth lenticular lens LL9, the tenth lenticular lens LL10, and the eleventh lenticular lens LL11 included in the lenticular lens unit 200 respectively display the left-eye image and the right-eye image, the left-eye image is refracted through the sixth lenticular lens LL6, the seventh lenticular lens LL7, and the eighth lenticular lens LL8 to be recognized by the left eye of the user and the right-eye image is refracted through the ninth lenticular lens LL9, the tenth lenticular lens LL10, and the eleventh lenticular lens LL11 to be recognized by the right eye of the used, and thereby the user recognizes the image from the 3D display device 1002 by the binocular disparity as the 3D image. At this time, the image respectively displayed by the first sub-pixel area PE1 and the fourth sub-pixel area PE4 has the first color through the sixth lenticular lens LL6 and the ninth lenticular lens LL9, the image respectively displayed by the second sub-pixel area PE2 and the fifth sub-pixel area PE5 has the second color through the seventh lenticular lens LL7 and the tenth lenticular lens LL10, and the image respectively displayed by the third sub-pixel area PE3 and the sixth sub-pixel area PE6 has the third color through the eighth lenticular lens LL8 and the eleventh lenticular lens LL11. Accordingly, the user recognizes the 3D image having various colors.

As described above, in the 3D display device 1005 according to the fifth exemplary embodiment, while the lenticular lens unit 200 as the viewing zone separation unit covers the first pixel area L_Pixel and the second pixel area R_Pixel, the sixth lenticular lens LL6, the seventh lenticular lens LL7, the eighth lenticular lens LL8, the ninth lenticular lens LL9, the tenth lenticular lens LL10, and the eleventh lenticular lens LL11 respectively have the first color, the second color, and the third color, thereby displaying the full color 3D image without the additional color filter.

That is, the color filter and the lenticular lens are not sequentially aligned on the display panel 100, but the lenticular lens unit 200 is simply only aligned on the display panel 100 such that the deterioration of the 3D image generated according to the alignment error may be minimized.

Also, the 3D display device 1005 according to the fifth exemplary embodiment does not require the additional color filter such that the entire thickness may be realized to be slim.

Next, referring to FIG. 7, a 3D display device according to the sixth exemplary embodiment will be described.

Figure 7:
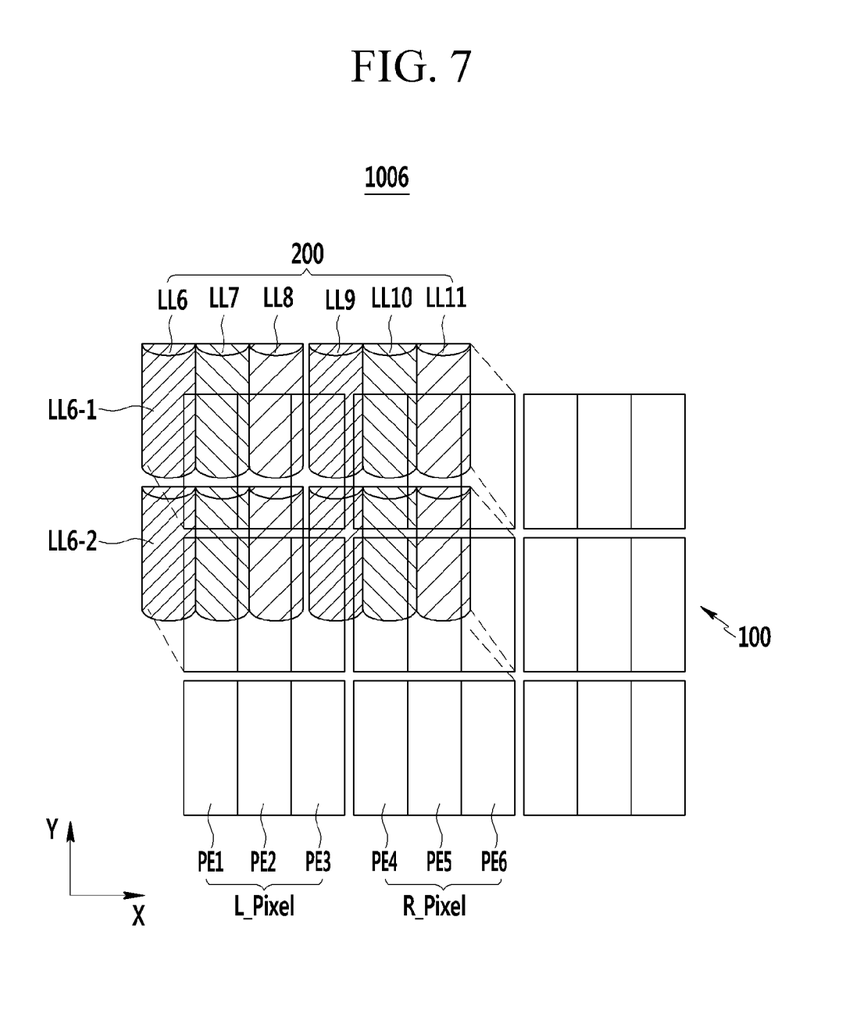
FIG. 7 is a view of a 3D display device according to the sixth exemplary embodiment.

FIG. 7 is a view of a 3D display device according to the sixth exemplary embodiment.

Parts that are different from the fifth exemplary embodiment will be described, and parts that are not described follow the fifth exemplary embodiment. For better comprehension and ease of description, the constituent elements of the sixth exemplary embodiment that are the same as the fifth exemplary embodiment will have the same reference numerals.

As shown in FIG. 7, the lenticular lens unit 200 of the 3D display device 1006 according to the sixth exemplary embodiment includes the sixth lenticular lens LL6, the seventh lenticular lens LL7, the eighth lenticular lens LL8, the ninth lenticular lens LL9, the tenth lenticular lens LL10, and the eleventh lenticular lens LL11.

The sixth lenticular lens LL6, the seventh lenticular lens LL7, the eighth lenticular lens LL8, the ninth lenticular lens LL9, the tenth lenticular lens LL10, and the eleventh lenticular lens LL11 are disposed in plural. The sixth lenticular lens LL6 includes a plurality of sub-sixth lenticular lenses LL6-1 and LL6-2. With the same principles, the seventh through eleventh lenticular lenses include a plurality of sub-seventh through sub-eleventh lenticular lenses, respectively. Lenses in each of the sub-sixth lenticular lenses, the sub-seventh lenticular lenses, the sub-eighth lenticular lenses LL8, the sub-ninth lenticular lenses, the sub-tenth lenticular lenses LL10, and the sub-eleventh lenticular lenses LL11 are disposed to be separated from each other in the second direction Y crossing the first direction X.

The above lens unit 200 serves as a viewing zone separation unit which separates a left-eye image L and a right-eye image R which are displayed through the first pixel area L_Pixel and the second pixel area R_Pixel to be recognized by the left eye and the right eye of the user, respectively.

As described above, in the 3D display device 1006 according to the sixth exemplary embodiment, while the lenticular lens unit 200 as the viewing zone separation unit covers the first pixel area L_Pixel and the second pixel area R_Pixel, the sixth lenticular lens LL6, the seventh lenticular lens LL7, the eighth lenticular lens LL8, the ninth lenticular lens LL9, the tenth lenticular lens LL10, and the eleventh lenticular lens LL11 respectively have the first color, the second color, and the third color, thereby displaying the full color 3D image without the additional color filter.

That is, the color filter and the lenticular lens are not sequentially aligned on the display panel 100, but the lenticular lens unit 200 is simply only aligned on the display panel 100 such that the deterioration of the 3D image generated according to the align error may be minimized.

Also, the 3D display device 1006 according to the sixth exemplary embodiment does not require the additional color filter such that the entire thickness may be realized to be slim.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A 3D display device comprising:
a display panel including a first pixel area displaying a left-eye image and a second pixel area neighboring the first pixel area and displaying a right-eye image; and
a lenticular lens unit positioned on the display panel to cover the first pixel area and the second pixel area, the lenticular lens unit comprising a first lens unit, a second lens unit and a third lens unit, the first pixel area including:
a first sub-pixel area;
a second sub-pixel area neighboring the first sub-pixel area in a first direction; and
a third sub-pixel area neighboring the second sub-pixel area in the first direction, the second pixel area including:
a fourth sub-pixel area neighboring the third sub-pixel area in the first direction;
a fifth sub-pixel area neighboring the fourth sub-pixel area in the first direction; and
a sixth sub-pixel area neighboring the fifth sub-pixel area in the first direction, the first lens unit covering the first sub-pixel area and the second sub-pixel area, the first lens unit having a first color, the second lens unit covering the third sub-pixel area and the fourth sub-pixel area, the second lens unit having a second color, the third lens unit covering the fifth sub-pixel area and the sixth sub-pixel area, the third lens unit having a third color, wherein the first lens unit includes a first lenticular lens having the first color, the second lens unit including a second lenticular lens having the second color, the third lens unit including a third lenticular lens having the third color, wherein the first lenticular lens includes a plurality of sub-first lenticular lenses, the sub-first lenticular lenses are disposed to be separated from each other in a second direction crossing the first direction, the second lenticular lens includes a plurality of sub-second lenticular lenses, the sub-second lenticular lenses are disposed to be separated from each other in the second direction, the third lenticular lens includes a plurality of sub-third lenticular lenses, and the sub-third lenticular lenses are disposed to be separated from each other in the second direction.

2. A 3D display device, comprising:
a display panel including a first pixel area displaying a left-eye image and a second pixel area neighboring the first pixel area and displaying a right-eye image; and
a lenticular lens unit positioned on the display panel to cover the first pixel area and the second pixel area, the first pixel area including:
a first sub-pixel area;
a second sub-pixel area neighboring the first sub-pixel area in a first direction; and
a third sub-pixel area neighboring the second sub-pixel area in the first direction, the second pixel area including:
a fourth sub-pixel area neighboring the third sub-pixel area in the first direction;
a fifth sub-pixel area neighboring the fourth sub-pixel area in the first direction; and
a sixth sub-pixel area neighboring the fifth sub-pixel area in the first direction, wherein the lenticular lens unit includes:
a sixth lenticular lens covering only the first sub-pixel area and having a first color;
a seventh lenticular lens covering only the second sub-pixel area and having a second color;
an eighth lenticular lens covering only the third sub-pixel area and having a third color;
a ninth lenticular lens covering only the fourth sub-pixel area and having the first color;
a tenth lenticular lens covering only the fifth sub-pixel area and having the second color; and
an eleventh lenticular lens covering only the sixth sub-pixel area and having the third color, wherein the sixth lenticular lens includes a plurality of sub-sixth lenticular lenses, the sub-sixth lenticular lenses are disposed to be separated from each other in a second direction crossing the first direction, the seventh lenticular lens includes a plurality of sub-seventh lenticular lenses, the sub-seventh lenticular lenses are disposed to be separated from each other in the second direction, the eighth lenticular lens includes a plurality of sub-eighth lenticular lenses, the sub-eighth lenticular lenses are disposed to be separated from each other in the second direction, the ninth lenticular lens includes a plurality of sub-ninth lenticular lenses, the sub-ninth lenticular lenses are disposed to be separated from each other in the second direction, the tenth lenticular lens includes a plurality of sub-tenth lenticular lenses, the sub-tenth lenticular lenses are disposed to be separated from each other in the second direction, the eleventh lenticular lens includes a plurality of sub-eleventh lenticular lenses, and the sub-eleventh lenticular lenses are disposed to be separated from each other in the second direction.

3. The 3D display device of claim 2, wherein the sixth lenticular lens, the seventh lenticular lens, the eighth lenticular lens, the ninth lenticular lens, the tenth lenticular lens, and the eleventh lenticular lens extend in the second direction crossing the first direction.

* * * * *